United States Patent [19]

Morihiro

[11] Patent Number: 4,613,317
[45] Date of Patent: Sep. 23, 1986

[54] CARDAN UNIVERSAL JOINTS

[75] Inventor: Shinji Morihiro, Komae, Japan

[73] Assignee: Nissan Motor Co., Ltd., Yokohama, Japan

[21] Appl. No.: 666,737

[22] Filed: Oct. 31, 1984

[30] Foreign Application Priority Data

Nov. 7, 1983 [JP] Japan ............ 58-172043[U]

[51] Int. Cl.$^4$ .............. F16C 33/76; F16D 3/26
[52] U.S. Cl. .................... 464/131; 277/95; 277/152; 277/205; 277/212 R; 384/486
[58] Field of Search .............. 277/65, 88, 95, 152, 277/153, 212 R; 384/477, 486; 464/11, 128, 131, 132

[56] References Cited

U.S. PATENT DOCUMENTS

| | | | |
|---|---|---|---|
| 1,604,202 | 10/1926 | Smith-Clarke | 464/128 |
| 1,941,764 | 1/1934 | Swenson | 277/95 X |
| 2,773,367 | 12/1956 | Slaght | 464/11 |
| 2,896,432 | 7/1959 | Hempel | 464/131 |
| 3,717,394 | 2/1973 | Pitner | 464/131 X |
| 3,906,746 | 9/1975 | Haines | 464/131 |
| 3,937,035 | 2/1976 | Fisher et al. | 464/131 X |
| 4,317,341 | 3/1982 | Krude | 464/11 |
| 4,530,675 | 7/1985 | Mazziotti | 277/95 X |

FOREIGN PATENT DOCUMENTS 720616 11/1965 Canada ............ 464/131

Primary Examiner—Stuart S. Levy
Assistant Examiner—Daniel P. Stodola
Attorney, Agent, or Firm—Leydig, Voit & Mayer, Ltd.

[57] ABSTRACT

A sealing member, which is interposed between an open end of a cap of a needle bearing and a shoulder of a cross spider, is fixedly attached to the open end of the cap so that the variation of the compression of the sealing member when installed in place is caused depending upon only the variations of the state of abutment in which the sealing member abuts upon the shoulder.

1 Claim, 4 Drawing Figures

CARDAN UNIVERSAL JOINTS

BACKGROUND OF THE INVENTION

1. Field of the Invention

The present invention relates to a universal joint of the cross and yoke type or a so-called Cardan or Hooke universal joint.

2. Description of the Prior Art

This type of universal joint is widely used in automotive drive lines, as a joint for a two-piece propeller shaft for instance.

FIG. 1 shows a prior art single Cardan universal joint for a two-piece propeller shaft. The joint is generally indicated by the reference numeral 10 and consists of an input yoke 12 to be connected to a driving shaft section (not shown) and formed at its bifurcate portions with a pair of radial openings 12a which are axially aligned with each other, an output yoke 14 to be connected to a driven shaft section (not shown) and formed at its bifurcate portions with a pair of radial openings 14a which are axially aligned with each other, a cross or cross spider 16 having two pairs of arms 16a and 16b which are respectively aligned to have common axes normal to each other, and four needle bearing assemblies 18 mounted in the openings 12a and 14a and supporting therein the cross arms 16a and 16b so that the input and output yokes 12 and 14 are joined by the cross spider 16 by interposing therebetween the needle bearing assemblies 18.

As shown in an enlarged scale in FIG. 2, each needle bearing assembly 18 consists of a cap 20 covering the cross arm 16a or 16b and having, with respect to the axis of the cross arm 16a or 16b, an inward open end where it is formed with a radially inward flange 20a, and a plurality of needle rollers 22 confined between the cap 20 and the cross arm 16a or 16b. The cap 20 is adapted to be force-fitted in the opening 12a or 14a and prevented from slipping out of the opening 12a or 14a by protruded wall portions 12b or 14b which are formed by caulking after insertion of the cap.

The cap 20 is filled with lubricant for lubricating the needle rollers 22 and the cross arm 16a or 16b. In order to prevent the lubricant from leaking out of the cap 20, an annular sealing member 24 is disposed between the open end of the cap 20 and the cross spider 16. To this end, the cross arm 16a or 16b is formed at its inward end with an annular shoulder 16c which faces the inward flange 20a of the cap 20. The sealing member 24 is adapted to be clamped between the inward flange 20a and the shoulder 16c to provide a seal therebetween, whereby to prevent the lubricant from leaking out of the cap 20 and at the same time prevent entry of foreign matters such as dust and water into the inside of the needle bearing 18.

The sealing member 24 is installed in place as follows. Firstly, it is placed onto the cross arm 16a or 16b and moved axially inwardly of same until it comes in contact with the the shoulder 16c. The bearing assembly 18 is then inserted into the opening 12a or 14a while receiving therein the cross arm 16a or 16b, allowing the sealing member 24 to be clamped between the inward flange 20a of the cap 20 and the shoulder 16c of the cross spider 16. The bearing assembly 18 is prevented from slipping out of the opening 12a or 14a by applying caulking to the wall of the opening 12a or 14a.

The degree of tightness or the amount of compression of the sealing member 24 when installed in place is intimately related to the sealing action and the durability of same. For example, if the amount of compression is too large to be included within predetermined limits a deteriorated durability of the sealing member 24 will result, whereas if too small a deteriorated sealing action will result. Accordingly, special care is required by the sealing member 24 upon installation of same so that the amount of compression is included within the predetermined limits.

However, with the prior art structure, the compression of the sealing member 24 when installed in place tends to vary beyond predetermined limits and therefore an excessive compression or an insufficient compression of the sealing member 24 tends to result. By experiments conducted by the applicant, it was found that such a large variation in the compression of the sealing member 24 results from the fact that the sealing member 24 is formed as an independent part separated from both the cap 20 and the cross spider 16 to have two abuttingly engaging portions and the fact that the compression of the sealing member 24 when installed in place varies depending upon the variation of the state of abutment in which the sealing member 24 abuts upon the inward flange 20a of the cap 20 and further upon the variation of the state of abutment in which the sealing member 24 abuts upon the shoulder 16c of the cross spider 16.

SUMMARY OF THE INVENTION

In accordance with the present invention, there is provided an improved Cardan universal joint. The universal joint of the present invention comprises as usual an input yoke formed at its bifurcate portions with a pair of radial openings axially aligned with each other, an output yoke formed at its bifurcate portions with a pair of radial openings axially aligned with each other, a cross spider having two pairs of arms respectively aligned to have common axes which are normal to each other, each of the cross arms being formed at its inward end with an annular shoulder, four needle bearings respectively mounted in the openings and supporting therein the cross arms so that the input and output yokes are joined by the cross spider by interposing therebetween the needle bearings, each of the needle bearings having a cap covering corresponding one of the cross arms and a plurality of needle rollers confined between the cap and the cross arm, the cap having, with respect to the axis of the cross arm, an inward open end where it is formed with a radially inward flange facing the shoulder, and an annular sealing member interposed between the open end and the shoulder to provide a seal therebetween.

In accordance with the present invention, the sealing member is fixedly attached or integrally fixed to the open end of the cap.

The above structure is quite effective for overcoming the drawbacks noted above.

It is accordingly an object of the present invention to provide an improved Cardan universal joint which can solve the problem noted above.

It is a further object of the present invention to provide an improved Cardan universal joint of the above-mentioned character which can assuredly prevent lubricant from leaking out of its bearings and at the same time prevent entry of foreign matters such as dust and water into the inside of the bearings, whereby to provide an improved durability.

It is a yet further object of the present invention to provide an improved Cardan universal joint of the above-mentioned character which can provide an assured and reliable operation.

BRIEF DESCRIPTION OF THE DRAWINGS

The features and advantages of the Cardan universal joint according to the present invention will become more clearly appreciated from the following description taken in conjunction with the accompanying drawings, in which.

DETAILED DESCRIPTION OF THE PREFERRED EMBODIMENTS

Figure 1:
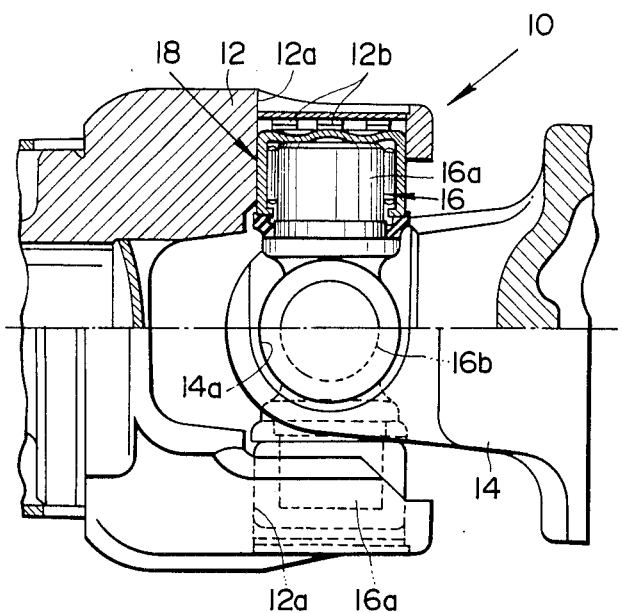
FIG. 1 is a partly sectional fragmentary side elevation of a prior art single Cardan universal joint.
Figure 2:
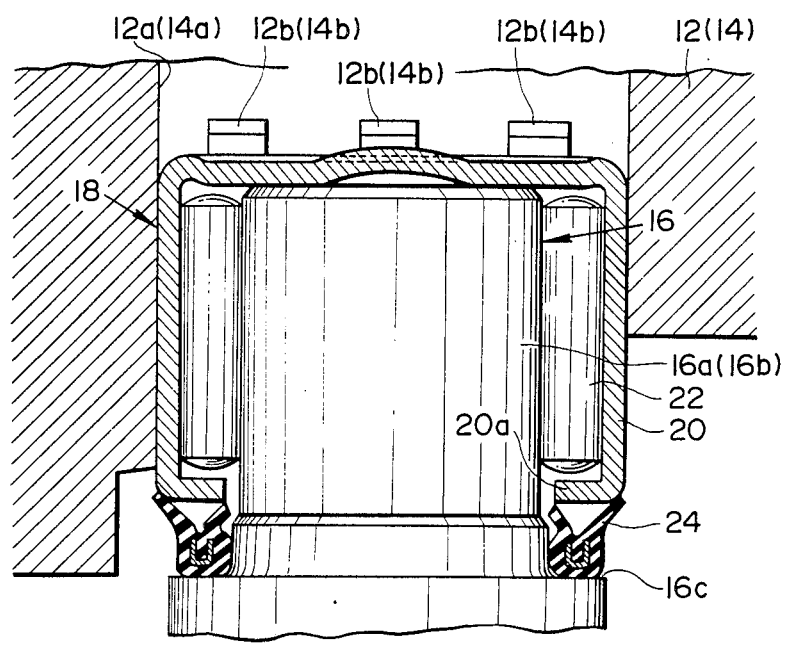
FIG. 2 is an enlarged cross section of a portion of the universal joint of FIG. 1.
Figure 3:
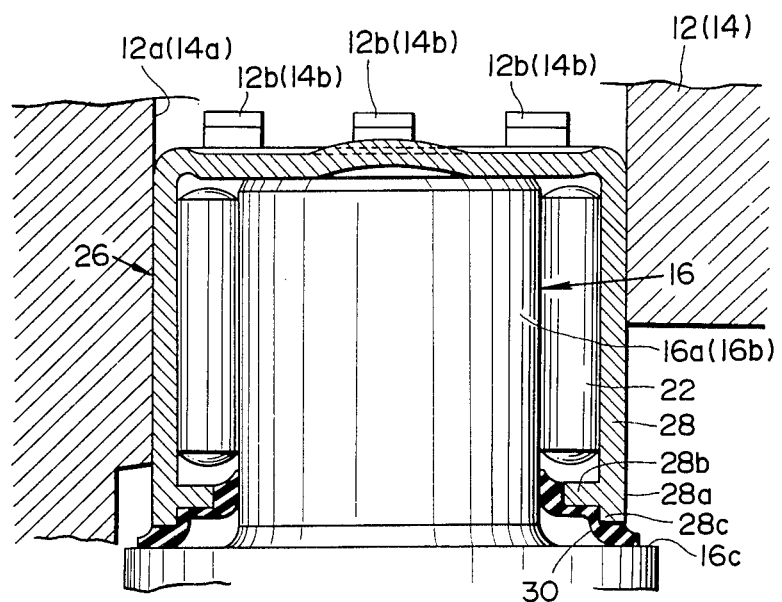
FIG. 3 is a view similar to FIG. 2 but showing an embodment of the present invention.

Referring to FIG. 3, in which parts and portions like or corresponding to those of the prior art universal joint of FIGS. 1 and 2 are designated by the same reference numerals, a Cardan universal joint according to the present invention comprises a cross spider 16 each arm 16a or 16b of which is supported by a needle bearing assembly 26 mounted in an opening 12a or 14a of an input or output yoke 12 or 14. The needle bearing assembly 26 includes a cap 28 arranged to cover the cross arm 16a or 16b and cooperate with the cross arm 16a or 16b to confine therebetween a plurality of rollers 22. The cap 28 has an open end 28a adjacent a shoulder 16c of the cross spider 16. The open end 28a of the cap 28 is in the form of an annular ring of an L-shaped cross section and has a radially inward flange 28b and an axially outward extension 28c located axially more outward than said inward flange.

In order to prevent lubricant from leaking out of the cap 28, an annular sealing member 30 is interposed between the cap 28 and the cross arm 16a or 16b.

In accordance with the present invention, the sealing member 30 is fixedly attached or integrally fixed to the open end 28a of the cap 28 prior to its installation on the cross arm 16a or 16b, i.e., prior to assembly of the joint. More specifically, the sealing member 30 is formed from rubber to have an L-like cross section and arranged to lie over the inner circumferential surface of the radially inward flange 28b and the axially outward surface of the axially outward extension 28c facing the shoulder 16c so that it contacts not only the shoulder 16c but also the circumferential periphery of the cross arm 16a or 16b. Accordingly, the sealing member 30 is adapted to provide a double or dual seal between the cap and the cross spider 16. The sealing member 30 is bonded to the open end 28a of the cap 28 by a suitable adhesive or bonded thereto upon curing, i.e., the sealing member 30 in a green or uncured state is bonded to the open end 28a of the cap 28 when it is cured.

The universal joint of the present invention is assembled substantially similarly to the prior art universal joint of FIGS. 1 and 2 except that the sealing member 30 is installed in place together with the cap 28.

With the above structure, the compression of the sealing member 30 when installed in place varies depending upon only the variation of the state of engagement in which the sealing member 30 abuts upon the shoulder 16c of the cross spider 16 since the sealing member 30 is fixedly attached or integrally fixed to the open end 28a of the cap 28. By the above structure, it becomes possible to make smaller the extent of variation in the compression of the sealing member so that the compression of the sealing member when installed in place can be assuredly included within the predetermined limits. Accordingly, the universal joint according to the present invention can effect an improved and reliable sealing action and thus can provide an improved durability and a reliable operation.

Figure 4:
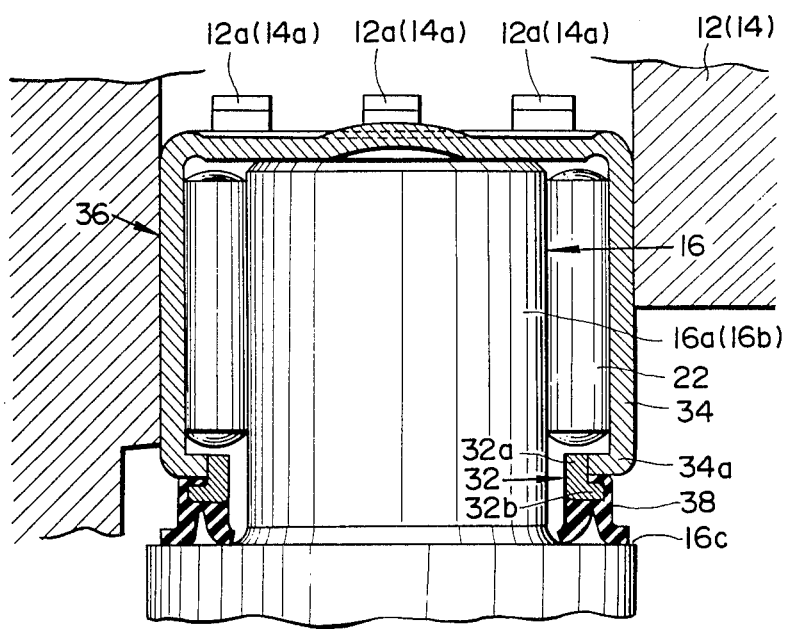
FIG. 4 is a view similar to FIG. 2 but showing a modification of the present invention.

Referring to FIG. 4, in which parts and portions like or corresponding to those of the prior art universal joint of FIGS. 1 and 2 are designated by the same reference numerals, a modified embodiment of the present invention comprises a retaining ring 32 having a body portion 32a force-fitted in a radially inwardly flanged open end 34a of a cap 34 of a needle bearing assembly 36 and a radially outwardly flanged portion 32b located outwardly of the cap 34. A sealing member 38 is bonded to the flanged portion 32b of the retaining ring 32 and adapted to be clamped in part between the flanged open end 34a of the cap 34 and the flanged portion 32b of the retaining ring 32 to provide a seal therebetween. The sealing member 38 and the retaining ring 32 is attached to the cap 34 prior to the installation of the cap 34. When installed in place, the sealing member 38 is adapted to come in contact with a shoulder 16c of a cross spider 16 to provide a seal therebetween.

This embodiment can produce substantially the same effects as the previous embodiment.

What is claimed is:

1. A Cardan universal joint comprising:
an input yoke formed at its bifurcate portions with a pair of radial opening axially aligned with each other;
an output yoke formed at its bifurcate portions with a pair of radial openings axially aligned with each other;
a cross spider having two pairs of arms respectively aligned to have common axes which are normal to each other, each of said cross arms being formed at its inward end with an annular shoulder;
four needle bearing assemblies respectively mounted in said openings and supporting therein said cross arms so that said input and output yokes are joined by said cross spider by interposing therebetween said needle bearing assemblies, each of said needle bearing assemblies having a cap covering a corresponding one of said cross arms and a plurality of needle rollers confined between said cap and said one of the cross arms, said cap having, with respect to the axis of said one of the cross arms, an inward open end formed with a radially inward flange facing said shoulder and said needle rollers and having an outer face and an inner circumferential surface surrounding the outer circumferential surface of the corresponding cross arm and providing an annular opening narrower than the diameter of said needle rollers, said open end of said cap being formed with an annular ring of an L-shaped cross section having said radially inward flange and an axial extension;
an annular sealing member interposed between said outer face of said flange of said cap and said shoulder having an annular section extending between said inner circumferential surface of said flange and said outer circumferential surface of said cross arm and filling said annular opening to provide a seal therebetween; and means directly bonding said annular sealing member to said outer face of said flange of said cap, said annular sealing member being composed of a single uniform sealing material, said radially inward flange having an inner circumferential surface surrounding the circumferential periphery of said one of the cross arms, said sealing member having an L-like cross section and being arranged to lie over to be bonded to said inner circumferential surface of said radially inward flange and said axial extension so that it contacts not only said shoulder but also the circumferential periphery of said one of the cross arms, said sealing member having one leg of said L-like cross section extending through said annular opening and a second leg extending radially and contacting said shoulder along one side of said second leg and extending between said axial extension and said shoulder.

* * * * *